UNITED STATES PATENT OFFICE.

CHARLES PECK, OF CHICAGO, ILLINOIS, ASSIGNOR OF ONE-HALF OF HIS RIGHT TO CHARLES H. KIRKHAM, OF SAME PLACE.

IMPROVEMENT IN COMPOSITION FOOD FROM DESICCATED EGGS.

Specification forming part of Letters Patent No. 184,479, dated November 21, 1876; application filed June 5, 1876.

*To all whom it may concern:*

Be it known that I, CHARLES PECK, of Chicago, in the county of Cook and State of Illinois, have invented a new and useful Improvement in Condensing and Preserving Eggs, which is fully described in the following specification.

My invention consists in a compound of sugar and dried-egg substance in a granulated form, as will be hereinafter fully set forth.

The desiccation of various substances, among which are eggs, has been heretofore accomplished; but the perishable nature of eggs is well known, and even when reduced to a solid condition by desiccation they are still liable to early decay unless some substance of a preservative nature is added. The preservative qualities of sugar are well known, and the object of my invention is to mix the sugar and egg substance together in such form that the compound will be convenient for transportation and use, and will be preserved in a wholesome condition for a great length of time.

In carrying out my invention the eggs are first broken into a shallow vessel, suitable for desiccating the mass rapidly. The pans containing the liquid mass of egg substance are then placed in a heated chamber, where they remain until the process of desiccation is completed and the mass becomes solidified. I do not, however, confine myself to any particular method of effecting the desiccation, as any known process suitable for the purpose may be employed. The solid mass of egg substance is then pulverized, and dry pulverized sugar is added in the proportion of about ten to twenty per cent. of the entire mass in bulk. The mixed compound thus obtained is in a dry granulated form, which may be conveniently handled and put up in suitable closed vessels and preserved perfectly fresh and pure for a long time.

If desired, the sugar and eggs may be mixed in about the proportions mentioned, before desiccation, and the mass thus formed dried until brought to a solid form. If this mass is then pulverized the product will be substantially the same as that described above.

This product is very convenient for use in the numberless instances in which eggs are employed for culinary and other purposes. It is only necessary to take a small portion of the granulated compound and moisten it suitably to adapt it to various purposes for which eggs are used in cooking. It is especially convenient as an article of food for invalids and children, either dissolved in a little milk or other liquid, or in a solid form, for even in the latter condition it is convenient to take and pleasant to the taste. If it is desired, the albuminous portion and the yolks of the eggs may be prepared separately, and thus a pure mixture of each with sugar obtained.

I am aware that sugar has been used with eggs to produce a pasty liquid mass. This product is inconvenient in use and more difficult to put up in suitable packages for preservation and transportation.

I do not claim, broadly, the use of sugar with eggs. I only claim to have obtained a compound of sugar and eggs in a particular form, which is more convenient for all purposes to which it is adapted, and may be more successfully preserved than a somewhat similar article in another form.

Having thus described my invention, what I claim as new, and desire to secure by Letters Patent, is—

The composition of dried-egg batter, or egg substance in a dried and granular form, and sugar, substantially as described.

CHARLES PECK.

Witnesses:
L. A. BUNTING,
L. M. HARRIS.